US012581430B2

(12) United States Patent (10) Patent No.: US 12,581,430 B2
Tan et al. (45) Date of Patent: Mar. 17, 2026

(54) RACH PROCESS FOR ANTENNA-DISTRIBUTED NETWORKS

(71) Applicant: Nokia Technologies Oy, Espoo (FI)

(72) Inventors: Jun Tan, Naperville, IL (US); Nitin Mangalvedhe, Naperville, IL (US); Frederick Vook, Naperville, IL (US); Qiping Zhu, Naperville, IL (US); William Hillery, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 300 days.

(21) Appl. No.: 18/559,629

(22) PCT Filed: May 19, 2021

(86) PCT No.: PCT/US2021/070582
§ 371 (c)(1),
(2) Date: Nov. 8, 2023

(87) PCT Pub. No.: WO2022/245401
PCT Pub. Date: Nov. 24, 2022

(65) Prior Publication Data
US 2024/0251448 A1 Jul. 25, 2024

(51) Int. Cl.
*H04W 52/34* (2009.01)
*H04W 74/0833* (2024.01)
(52) U.S. Cl.
CPC ..... *H04W 52/346* (2013.01); *H04W 74/0833* (2013.01)
(58) Field of Classification Search
CPC ........... H04W 52/346; H04W 74/0833; H04W 52/322; H04W 52/50; H04W 74/002; H04W 52/146
(Continued)

(56) References Cited

U.S. PATENT DOCUMENTS 9,930,700 B2 * 3/2018 Wang ...................... H04W 4/70
11,324,052 B2 * 5/2022 Irukulapati ....... H04W 74/0833
(Continued)

FOREIGN PATENT DOCUMENTS

CA 3061962 A1 * 11/2018 ............ H04W 52/04
WO 2020/009509 A1 1/2020

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.
(Continued)

*Primary Examiner* — Mahendra R Patel
(74) *Attorney, Agent, or Firm* — Robert P. Michal, Esq.; Rimon PC

(57) ABSTRACT

Improved techniques of include performing random access in an antenna-distributed network include introducing a new parameter, as reduced Tx power indicator, in the RAR of Msg-2 that indicates a reduced total Tx power of all antenna nodes of the antenna-distributed network. When the gNB receives a Msg-1, the gNB determines a subset of the distributed antenna nodes to which the gNB will send the RAR in the Msg-2 with the reduced total Tx power needed to transmit the Msg-2 to only those antenna nodes in the subset. The RAR includes a new parameter indicating the reduced total Tx power used to transmit the RAR to the UE. The UE then uses the value of the new parameter to estimate a pathloss for the Msg-3 and PUSCH transmission.

4 Claims, 8 Drawing Sheets

Example Wireless Network 130

(58) Field of Classification Search
USPC .......................................................... 370/329
See application file for complete search history.

(56) References Cited

U.S. PATENT DOCUMENTS

| | | | | |
|---|---|---|---|---|
| 11,647,543 B2 * | 5/2023 | Dinan | ................... | H04W 52/50 |
| | | | | 370/329 |
| 11,683,842 B2 * | 6/2023 | Kang | .................. | H04W 56/005 |
| | | | | 370/329 |
| 11,743,831 B2 * | 8/2023 | Lee | ..................... | H04W 52/146 |
| | | | | 370/329 |
| 11,856,393 B2 * | 12/2023 | Xue | .................... | H04W 52/242 |
| 2016/0150484 A1 * | 5/2016 | Seo | ..................... | H04W 52/262 |
| | | | | 455/522 |
| 2020/0137806 A1 * | 4/2020 | Islam | .................. | H04L 27/2607 |
| 2020/0252974 A1 * | 8/2020 | Akkarakaran | .... | H04W 74/0836 |

OTHER PUBLICATIONS

"Mobility RS design for supporting multi-beam operations", 3GPP TSG RAN WG1 #87, R1-1612470, Agenda item: 7.1.2.6, Samsung, Nov. 14-18, 2016, 4 pages.
International Search Report and Written Opinion received for corresponding Patent Cooperation Treaty Application No. PCT/US2021/070582, dated Feb. 11, 2022, 12 pages.
Office action received for corresponding European Patent Application No. 21735115.4, dated Sep. 16, 2024, 6 pages.
Office action received for corresponding European Patent Application No. 21735115.4, dated May 14, 2025, 6 pages.
Office action received for corresponding European Patent Application No. 21735115.4, dated Nov. 28, 2025, 7 pages.

* cited by examiner

Example Wireless Network 130

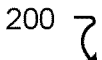
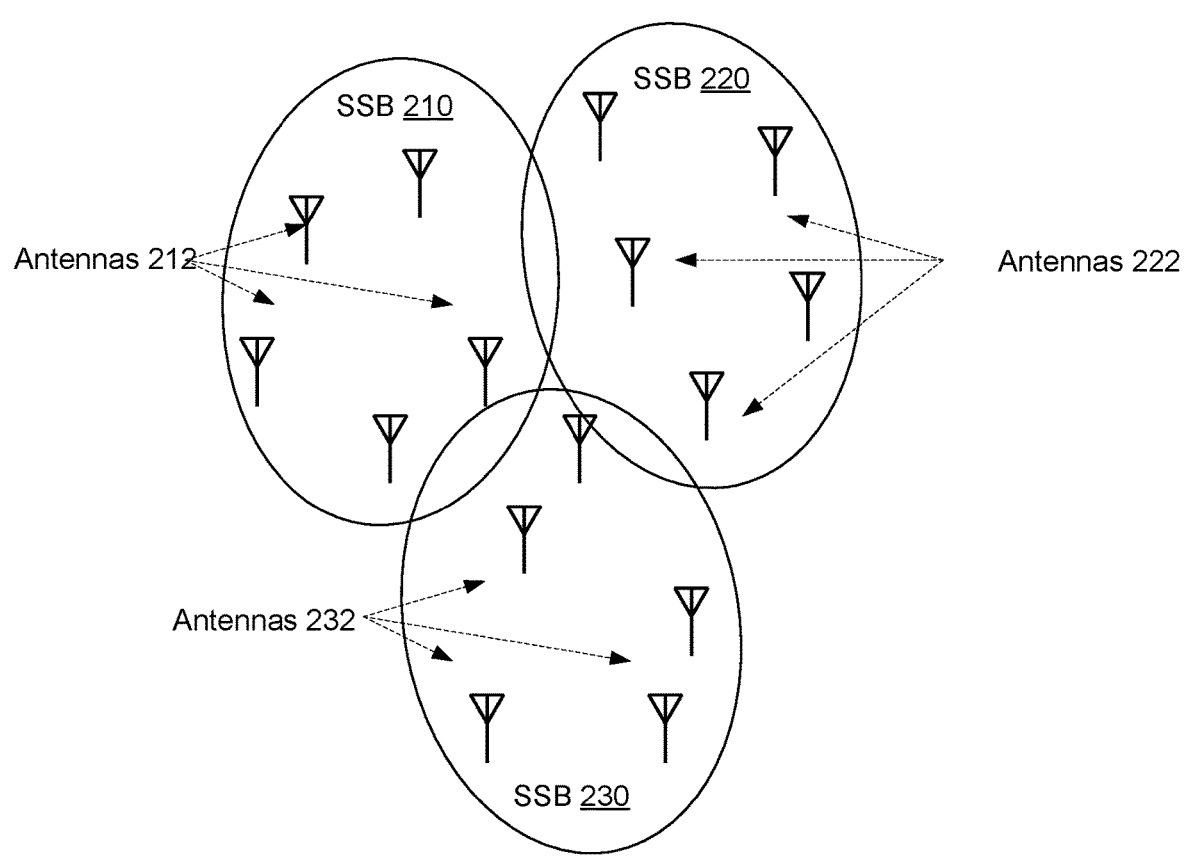
FIG. 2

300

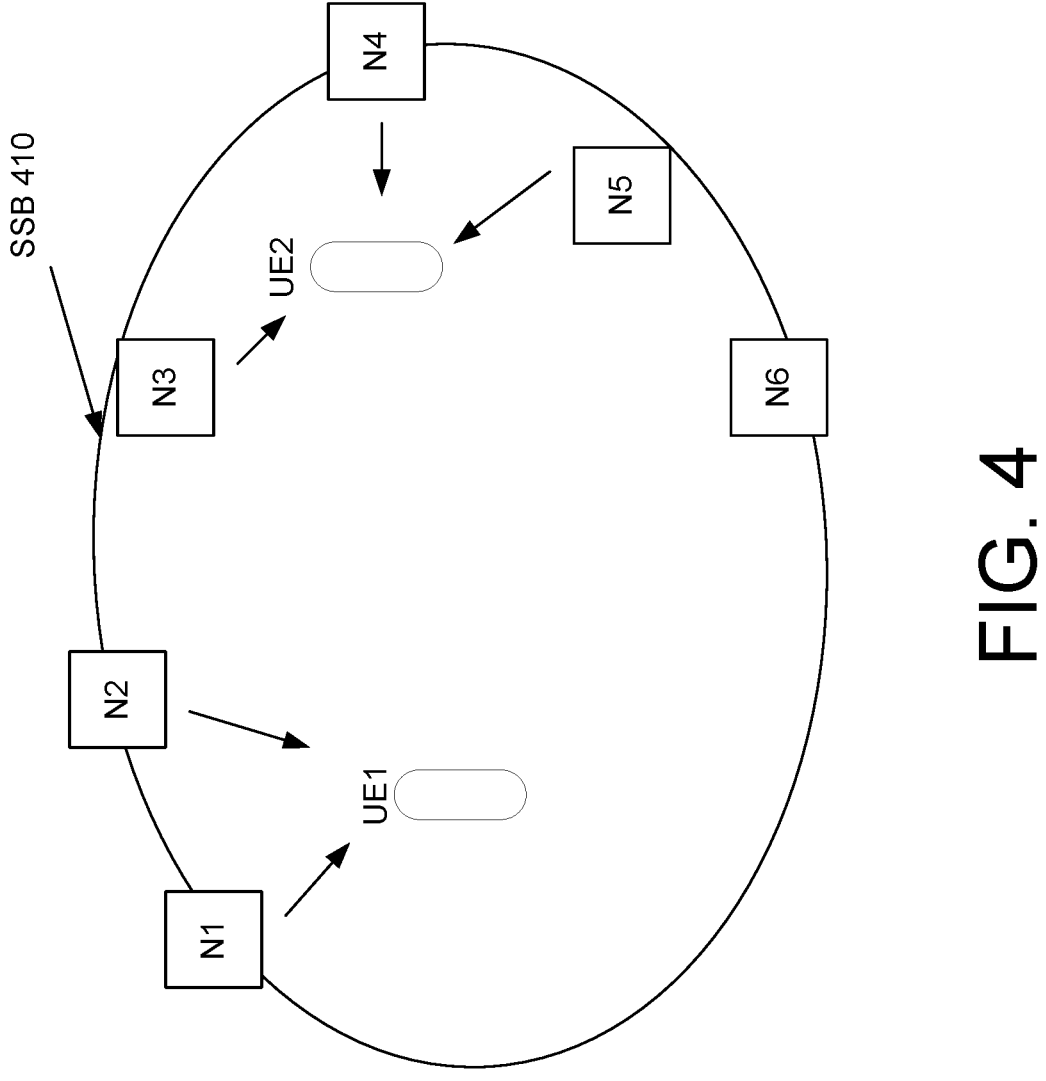
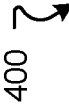
FIG. 4

500

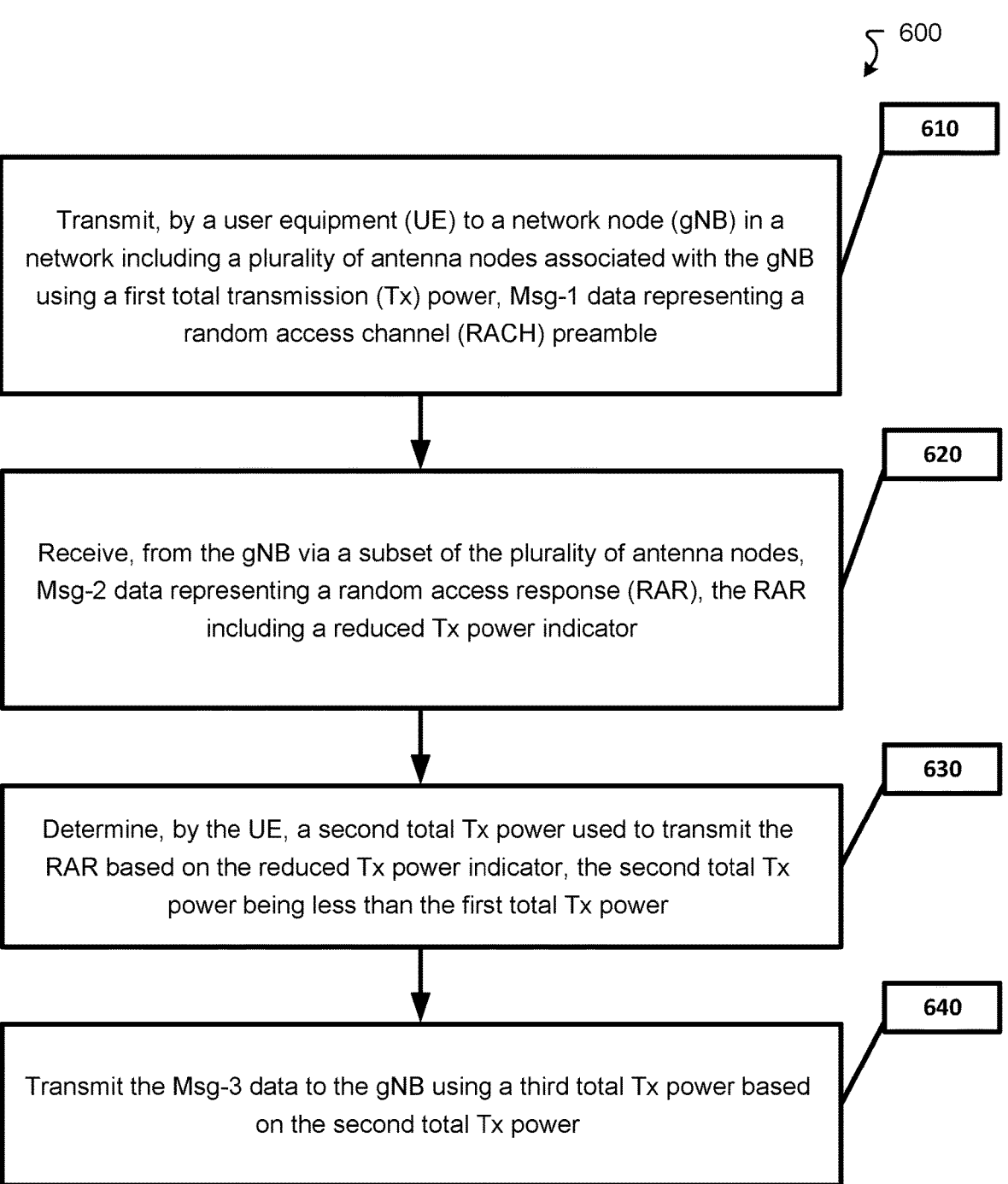

600

610

Transmit, by a user equipment (UE) to a network node (gNB) in a network including a plurality of antenna nodes associated with the gNB using a first total transmission (Tx) power, Msg-1 data representing a random access channel (RACH) preamble

620

Receive, from the gNB via a subset of the plurality of antenna nodes, Msg-2 data representing a random access response (RAR), the RAR including a reduced Tx power indicator

630

Determine, by the UE, a second total Tx power used to transmit the RAR based on the reduced Tx power indicator, the second total Tx power being less than the first total Tx power

640

Transmit the Msg-3 data to the gNB using a third total Tx power based on the second total Tx power

FIG. 6

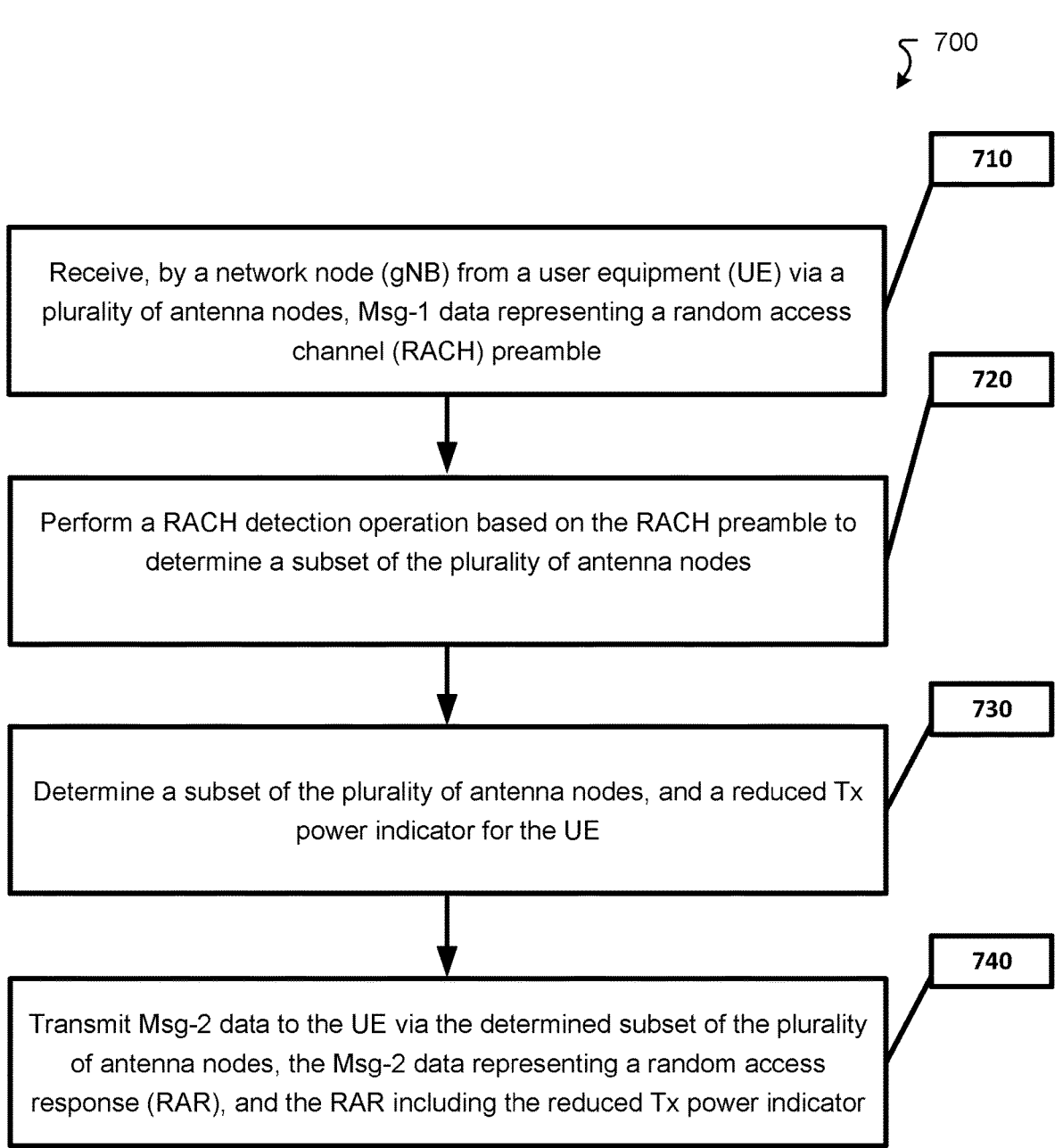

700

710

Receive, by a network node (gNB) from a user equipment (UE) via a plurality of antenna nodes, Msg-1 data representing a random access channel (RACH) preamble

720

Perform a RACH detection operation based on the RACH preamble to determine a subset of the plurality of antenna nodes

730

Determine a subset of the plurality of antenna nodes, and a reduced Tx power indicator for the UE

740

Transmit Msg-2 data to the UE via the determined subset of the plurality of antenna nodes, the Msg-2 data representing a random access response (RAR), and the RAR including the reduced Tx power indicator

FIG. 7

RACH PROCESS FOR ANTENNA-DISTRIBUTED NETWORKS

RELATED APPLICATION

This application was originally filed as PCT Application No. PCT/US2021/070582, filed on 19 May 2021, which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example, mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, by a user equipment (UE) to a network node (gNB) in a network including a plurality of antenna nodes associated with the gNB using a first total transmission (Tx) power, Msg-1 data representing a random access channel (RACH) preamble. The method further includes receiving, from the gNB via a subset of the plurality of antenna nodes, Msg-2 data representing a random access response (RAR), the RAR including a reduced Tx power indicator. The method further includes determining, by the UE, a second total Tx power used to transmit the RAR based on the reduced Tx power indicator, the second total Tx power being less than the first total Tx power. The method further includes transmitting the Msg-3 data to the gNB using a third total Tx power based on the second total Tx power.

According to an example implementation, an apparatus includes at least one processor and at least one memory including computer program code, the at least one memory and the computer program code configured to, with the at least one processor, cause the apparatus at least to transmit, by a user equipment (UE) to a network node (gNB) in a network including a plurality of antenna nodes associated with the gNB using a first total transmission (Tx) power, Msg-1 data representing a random access channel (RACH) preamble. The at least one memory and the computer program code are further configured to, with the at least one processor, cause the apparatus at least to receive, from the gNB via a subset of the plurality of antenna nodes, Msg-2 data representing a random access response (RAR), the RAR including a reduced Tx power indicator. The at least one memory and the computer program code are further configured to, with the at least one processor, cause the apparatus at least to determine, by the UE, a second total Tx power used to transmit the RAR based on the reduced Tx power indicator, the second total Tx power being less than the first total Tx power. The at least one memory and the computer program code are further configured to, with the at least one processor, cause the apparatus at least to transmit the Msg-3 data to the gNB using a third total Tx power based on the second total Tx power.

According to an example implementation, an apparatus includes means for transmitting, by a user equipment (UE) to a network node (gNB) in a network including a plurality of antenna nodes associated with the gNB using a first total transmission (Tx) power, Msg-1 data representing a random access channel (RACH) preamble. The apparatus also includes means for receiving, from the gNB via a subset of the plurality of antenna nodes, Msg-2 data representing a random access response (RAR), the RAR including a reduced Tx power indicator. The apparatus further includes means for determining, by the UE, a second total Tx power used to transmit the RAR based on the reduced Tx power indicator, the second total Tx power being less than the first total Tx power. The apparatus further includes means for transmitting the Msg-3 data to the gNB using a third total Tx power based on the second total Tx power.

According to an example implementation, a computer program product includes a computer-readable storage medium and storing executable code that, when executed by at least one data processing apparatus, is configured to cause the at least one data processing apparatus to transmit, by a user equipment (UE) to a network node (gNB) in a network including a plurality of antenna nodes associated with the gNB using a first total transmission (Tx) power, Msg-1 data representing a random access channel (RACH) preamble. The executable code, when executed by at least one data processing apparatus, is also configured to cause the at least one data processing apparatus to receive, from the gNB via a subset of the plurality of antenna nodes, Msg-2 data representing a random access response (RAR), the RAR including a reduced Tx power indicator. The executable code, when executed by at least one data processing apparatus, is also configured to cause the at least one data processing apparatus to determine, by the UE, a second total Tx power used to transmit the RAR based on the reduced Tx power indicator, the second total Tx power being less than the first total Tx power. The executable code, when executed by at least one data processing apparatus, is also configured to cause the at least one data processing apparatus to transmit the Msg-3 data to the gNB using a third total Tx power based on the second total Tx power.

According to an example implementation, a method includes receiving, by a network node (gNB) from a user equipment (UE) via a plurality of antenna nodes, Msg-1 data representing a random access channel (RACH) preamble. The method further includes performing a RACH detection operation based on the RACH preamble to determine a subset of the plurality of antenna nodes, for the specific UE. The method further includes determining a subset of the plurality of antenna nodes, and a reduced Tx power indicator for the UE. The method further includes transmitting Msg-2 data to the UE via the determined subset of the plurality of antenna nodes, the Msg-2 data representing a random access response (RAR), the RAR including the reduced Tx power indicator.

According to an example implementation, an apparatus includes at least one processor and at least one memory including computer program code, the at least one memory and the computer program code configured to, with the at least one processor, cause the apparatus at least to receive, by a network node (gNB) from a user equipment (UE) via a plurality of antenna nodes, Msg-1 data representing a random access channel (RACH) preamble. The at least one memory and the computer program code are further configured to perform a RACH detection operation based on the RACH preamble to determine a subset of the plurality of antenna nodes. The at least one memory and the computer program code are further configured to determine a subset of the plurality of antenna nodes, and a reduced Tx power indicator for the UE. The at least one memory and the computer program code are further configured to transmit Msg-2 data to the UE via the determined subset of the plurality of antenna nodes, the Msg-2 data representing a random access response (RAR), the RAR including the reduced Tx power indicator.

According to an example implementation, an apparatus includes means for receiving, by a network node (gNB) from a user equipment (UE) via a plurality of antenna nodes, Msg-1 data representing a random access channel (RACH) preamble; means for performing a RACH detection operation based on the RACH preamble to determine a subset of the plurality of antenna nodes, for the specific UE; means for determining a subset of the plurality of antenna nodes, and a reduced Tx power indicator for the UE; and means for transmitting Msg-2 data to the UE via the determined subset of the plurality of antenna nodes, the Msg-2 data representing a random access response (RAR), the RAR including the reduced Tx power indicator.

According to an example implementation, a computer program product includes a computer-readable storage medium and storing executable code that, when executed by at least one data processing apparatus, is configured to cause the at least one data processing apparatus to receive, by a network node (gNB) from a user equipment (UE) via a plurality of antenna nodes, Msg-1 data representing a random access channel (RACH) preamble. The executable code, when executed by at least one data processing apparatus, is also configured to cause the at least one data processing apparatus to perform a RACH detection operation based on the RACH preamble to determine a subset of the plurality of antenna nodes. The executable code, when executed by at least one data processing apparatus, is also configured to cause the at least one data processing apparatus to determine a subset of the plurality of antenna nodes, and a reduced Tx power indicator for the UE. The executable code, when executed by at least one data processing apparatus, is also configured to cause the at least one data processing apparatus to transmit Msg-2 data to the UE via the determined subset of the plurality of antenna nodes, the Msg-2 data representing a random access response (RAR), the RAR including the reduced Tx power indicator.

The details of one or more examples of implementations are set forth in the accompanying drawings and the description below. Other features will be apparent from the description and drawings, and from the claims.

BRIEF DESCRIPTION OF THE DRAWINGS

FIG. 2 is a diagram illustrating an antenna-distributed network according to an example implementation.

FIG. 4 is a diagram illustrating a distributed antenna deployment according to an example implementation.

FIG. 6 is a flow chart illustrating a RACH procedure for an antenna-distributed network according to an example implementation.

FIG. 7 is a flow chart illustrating a RACH procedure for an antenna-distributed network according to an example implementation.

DETAILED DESCRIPTION

Figure 1:
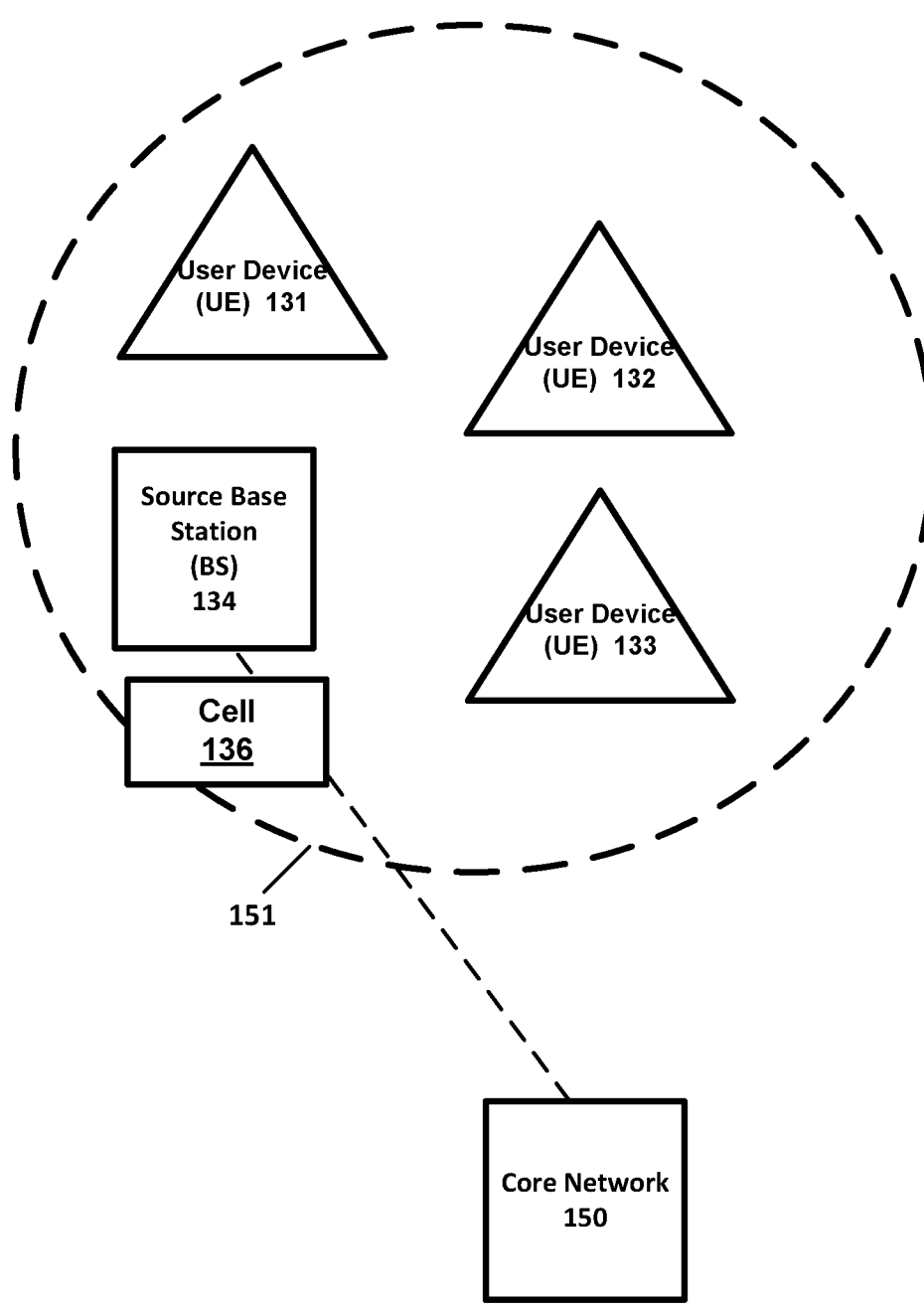
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

An antenna-distributed network, or a distributed MIMO (D-MIMO) system, is a wireless network where antennas associated with one gNB are distributed over a large geographical area. One example of such a network includes multiple distributed antennas that may be associated with one SSB, which SSB is configured by one gNB. Another example of an antenna-distributed network is a multi-TRP deployment, where each TRP/AP may consist of multiple co-located antennas, but a large number of TRPs are geographically distributed.

In such an antenna-distributed network, the transmit power of each antenna may be small. Coherent SSB transmission or SFN transmission of SSBs may be used, and beamforming with multiple distributed antennas may be necessary to achieve coverage of SSB transmissions. Multiple distributed antennas can be configured to form one SSB over a geographical area. Within the SSB coverage, a UE can perform cell-search by detecting SSB beams. Different SSBs are configured with different set of antennas. High speed backhaul connections link all distributed antennas in the system.

For a UE in an antenna-distributed network, the initial UE access procedure is the RACH process. A standard RACH procedure has 4 RACH messages. Msg-1 includes the RACH preamble or RACH signature. Msg-2 includes the RACH response (RAR) message including UL grant information. The RACH msg-3 includes an initial RRC request from the UE. And msg-4 includes the C-RNTI or contention resolution from the gNB.

UL power control of PRACH is usually needed. Based on the NR specification, the transmit power of PRACH is calculated as $$P_{PRACH,b,f,c}(i) = \min\{P_{CMAX,f,c}(i), P_{PRACH,target,f,c} + PL_{b,f,c}\},$$

where $P_{PRACH,\ target,\ f,c}$ is the PRACH target reception power, $PL_{b,f,c}$ is the pathloss for the active UL BWP b of carrier f for serving cell c based on the DL RS. The two parameters, PRACH target reception power and pathloss (PL), are based on the assumption of a co-located-antenna network. This general assumption may not hold for an antenna-distributed network.

In conventional approaches to performing random access in an antenna-distributed network, the PRACH UL power control process depends on the PRACH target reception power $P_{PRACH,\ target,\ f,c}$ and pathloss estimation $PL_{b,f,c}$ as specified above. For the D-MIMO deployment, these two values may have different meanings. In the case of SFN transmission of DL RS, pathloss estimation might be an "average" value. When a UE is close to one DL antenna in the D-MIMO deployment, its PL measurement from DL received power may be dominated by the closest antenna. The PRACH Tx power based on this PL measurement may not enable PRACH reception at a remote antenna. This may result in poor PRACH performance. When the gNB is sending its RAR (msg-2) to the UE, this is a problem on whether the remote antenna node—which barely receives RACH preamble—shall transmit the RAR signal. If the remote node sends the RAR (msg-2), its transmitting signal can barely contribute to the reception of msg-2 at the UE side and it may cause unnecessary interference to other UEs nearby. If the remote node won't send the RAR, there are other issues related to RACH procedure for D-MIMO deployment. These issues are demonstrated in an example deployment shown in FIG. 2.

FIG. 2 illustrates an example an antenna-distributed network 200. The antenna-distributed network 200 includes cells to which synchronization signal blocks (SSBs) 210, 220, and 230, respectively correspond. The SSB 210 includes antennas 210 distributed throughout, as SSB 220 has distributed antennas 222 and SSB 230 has distributed antennas 232. The SSBs 210, 220, and 230 provide a UE the information needed to begin a RACH procedure.

Figure 3:
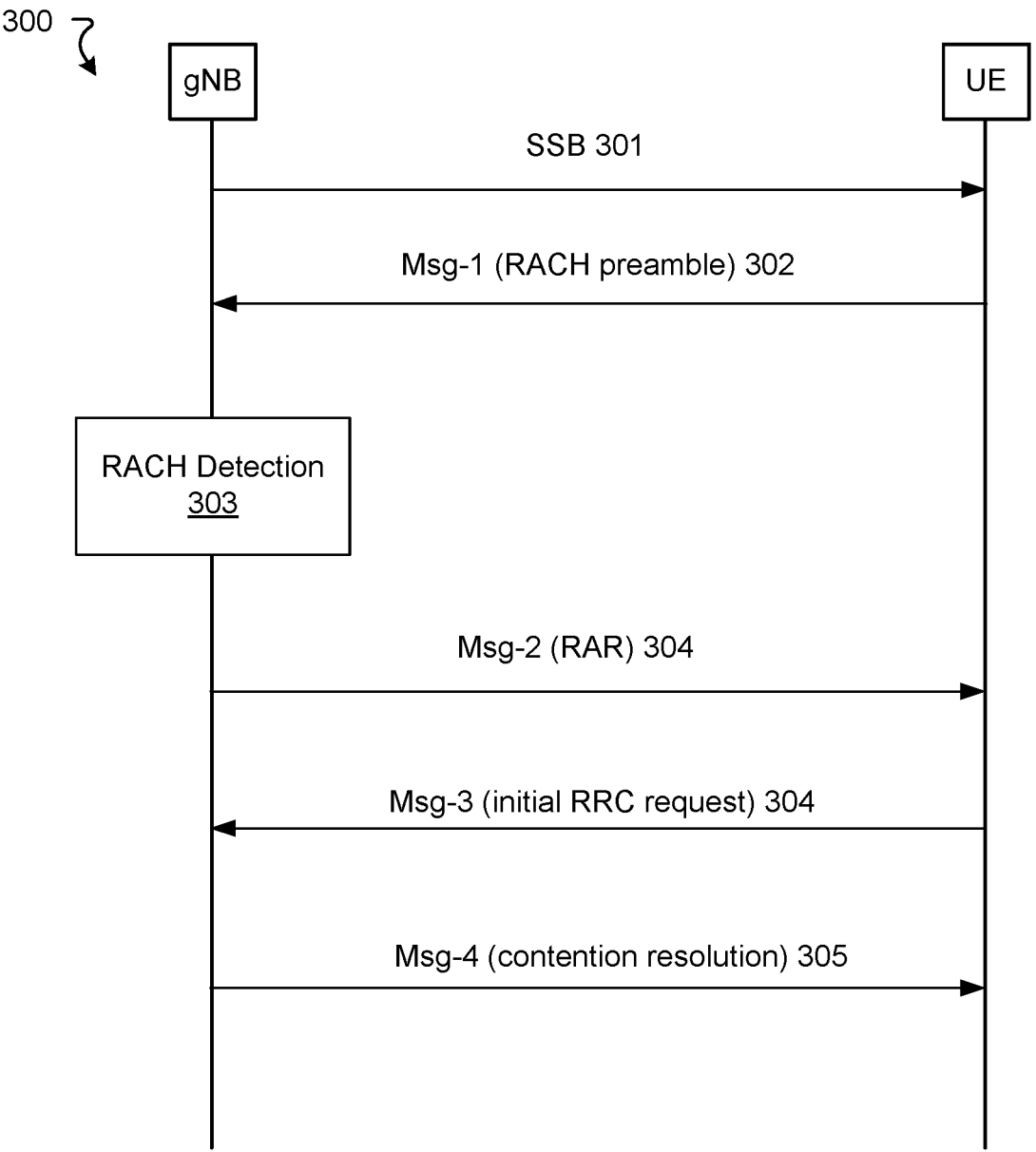
FIG. 3 is a sequence diagram illustrating a general RACH procedure, according to an example implementation.

FIG. 3 is a sequence diagram illustrating a general RACH procedure 300. At 301, the gNB transmits a SSB to the UE. At 302, based on data from the SSB, the UE transmits a Msg-1 (RACH preamble) to the gNB. At 303, the gNB performs a RACH detection operation. At 304, the gNB transmits a Msg-2 (RAR) to the UE; the RAR includes uplink (UL) grant information. At 305, the UE transmits an initial radio resource control (RRC) request to establish a RRC connection with the gNB. At 306, the gNB transmits a Msg-4 to the UE; the Msg-4 includes a cell radio network temporary identifier (C-RNTI) or contention resolution.

For RACH msg-1 transmission, a UE uses open loop power control for its RACH signature transmission. The RACH Tx power is determined by the UE with its estimation of DL pathloss from the SSB. For Msg-1 reception, the question is which node or which set of nodes shall receive the RACH signature? As shown in FIG. 2, UE1 and UE2 may need different sets of antenna nodes for its RACH reception. When gNB sends its RAR message (Msg-2) to UE, it is unclear which node or which set of nodes shall transmit msg-2 to the UE. It is also unclear how to determine the UE-specific Rx/Tx antenna nodes at the gNB side.

In contrast to the above-described conventional approaches to performing random access in an antenna-distributed network, improved techniques of performing random access in an antenna-distributed network include introducing a new parameter in the RAR of Msg-2 that indicates a reduced total Tx power of all antenna nodes of the antenna-distributed network. For example, when a UE sends a Msg-1 to a gNB as part of a RACH procedure, and when the gNB receives the Msg-1, the gNB determines a subset of the distributed antenna nodes to which the gNB will send the RAR in the Msg-2 with the reduced total Tx power needed to transmit the Msg-2 to only those antenna nodes in the subset. The RAR includes a new parameter indicating the reduced total Tx power used to transmit the RAR to the UE. The UE then uses the value of the new parameter to estimate a pathloss for the Msg-3 and physical UL shared channel (PUSCH) transmission. Based on the pathloss estimation, the UE transmits the Msg-3 to the gNB using an updated value of the reduced total Tx power based on the reduced total Tx power and the pathloss estimate.

Advantageously, the above-described improved technique for performing random access in an antenna-distributed network can reduce UE Tx power for Msg-3 transmission, reduce UL interference, and improve spectrum efficiency. Moreover, the above-described improved technique may also reduce the number of Tx antenna nodes for DL Msg-2 transmission from the gNB.

With D-MIMO deployment, a UE will perform cell search within one SSB that is transmitted by multiple distributed antennas of one gNB. For RACH access, the UE may transmit its RACH Msg-1 as a RACH preamble (signature) to all antenna nodes with UL power control. All nodes should be able to receive the RACH preamble.

In some implementations, each individual antenna node can receive and detect RACH preamble independently. In some implementations, groups of nodes rather than individual nodes are used to receive and detect a physical RACH (PRACH) preamble independently.

After all nodes receives the RACH preamble, the gNB may apply for a TC-RNTI and DL and/or UL scheduling resources for the specific UE. There are new steps for RACH Msg-2 transmission:

The gNB may determine the responding antenna nodes that may send RAR (Msg-2) to the UE. In some implementations, this determination may be based on the signal power of the RACH preamble received at the individual antenna nodes or groups of antenna nodes.

The network can make the DL/UL scheduling resources be specific for a set of nodes. Different sets of nodes may use the same DL/UL resource for Msg-2/3/4.

A set of limited nodes, comprising the determined responding antenna nodes, sends RAR, that shall include a RACH identifier, timing advance (TA) info, initial UL grant, temporary C-RNTI, and a new parameter as number of reduced nodes or the reduced total Tx power of all antenna nodes.

The reduced total Tx power can be used by UE to determine DL path loss, which is used for UL power control for PUSCH of msg-3. Once it receives the RAR (Msg-2), the UE may estimate the path loss based on the reduced total Tx power. PUSCH (Msg-3) transmission may be based on the updated estimation of path loss.

FIG. 4 is a diagram illustrating an example distributed antenna deployment 400 including a cell covered by SSB 410. Within the cell, there are two UEs labelled UE1 and UE2. At the edge of the cell are antenna nodes labelled N1-N6. As shown in FIG. 4, UE1 is closest to antenna nodes N1 and N2, while UE2 is closest to antenna nodes N3-N6.

Following NR's specification, antenna nodes contributing to one SSB shall be responsible for receiving (Rx)/transmitting (Tx) of RACH. Such implementation might result in poor RACH performance. From the PRACH power control procedure, UE1 may only be able to transmit its RACH signature to its closest antenna nodes, e.g., N1 and N2. If only N1 and N2 send Msg-2, the Rx power of Msg-2 for UE1 is reduced due to the reduced number of transmitting antenna nodes. The UE may have an incorrect pathloss estimation for its sequential Msg-3 and PUSCH transmission, because the UE has no knowledge of the DL reduced total Tx power.

Using the example in FIG. 4, a RACH message transmission may follow the following steps:

Msg-1:
UE1 and UE2 send their RACH signatures (msg1) to the nodes: N1~N6, which form one SSB for a distributed antenna network.
All nodes receive the two messages.

Msg-2:
The network decides to use antenna nodes (N1, N2) to respond to UE1 and antenna nodes (N3, N4, N5) for UE2.
Msg2 is sent to both UEs using the previously determined antenna nodes with the #of node info (or reduced total of DL Tx power).
Msg2 is carried with DL control information (DCI) of one physical DL control channel (PDCCH). The PDCCH carrying Msg2 can use either different resource or the same resource.
Also, the initial UL grant within the RAR of Msg-2 will indicate the PUSCH resource of UE1 and UE2. These PUSCH resources for the two UEs may either be separated or shared depending on the network's scheduler.

Msg-3:
UE uses DL reference signal (RS) and node info (#or nodes, or the reduced total DL Tx power) in Msg-2 to determine its UL total TX power for Msg-3.
UE1 and UE2 send respective Msg-3 to the gNB via the distributed antennas. Nevertheless, by using the adjusted reduced total TX power, only antenna nodes N1 and N2 receive the Msg-3 from UE1 with sufficient TX power, and antenna nodes N3-N5 receive the Msg-3 from UE2 with sufficient TX power. In some implementations, UE1 sends Msg-3 only over nodes N1 and N2, and UE2 sends its Msg-3 to nodes N3-N5.
Depending on initial UL grant information of Msg-3, UE1 and UE2 may share their uplink resource for PUSCH transmission.
The two uplink Tx can share the same uplink resource for better spectrum efficiency.
The PUSCH resource sharing may be determined by the initial UL grant information of Msg-2.

Msg-4:
Network may send C-RNTI or provide contention resolution for completion of the RACH process.

Figure 5:
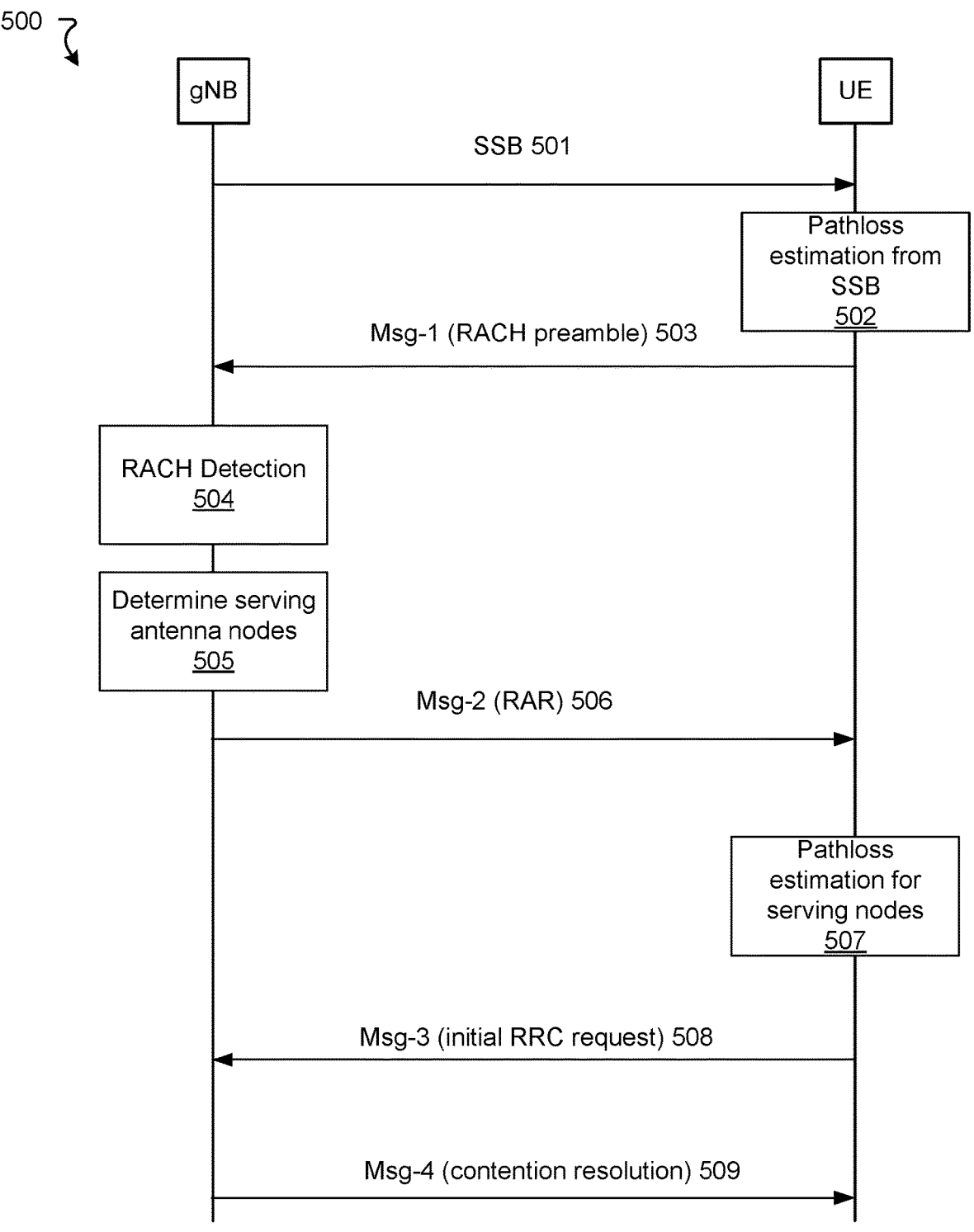
FIG. 5 is a sequence diagram illustrating a RACH procedure for an antenna-distributed network according to an example implementation.

FIG. 5 is a sequence diagram illustrating an example RACH procedure 500 for an antenna-distributed network.

At 501, the gNB transmits a SSB to the UE in an antenna-distributed network.

At 502, the UE estimates a pathloss from the SSB. This pathloss assumes that each antenna node is serving the UE equally: accordingly, this pathloss estimate may not be accurate.

At 503, the UE transmits a Msg-1 (RACH preamble) to the gNB using a total Tx power based on the pathloss estimate.

At 504, the gNB performs a RACH detection operation.

At 505, the gNB determines, based on the received power from each of the antenna nodes in the antenna-distributed network in the transmission of the Msg-1, a subset of the antenna nodes that are effectively serving the UE. The determination of RACH responding nodes shall be performed based on individual RACH detection. This process is based on the gNB implementation. One approach can follow these steps. Assume that one antenna node can detect RACH Rx power. Let the detected RACH Rx power at node-k be $\gamma_k$, which is calculated based on RACH signature correlation.

> If all $\gamma_k$ are about uniformly distributed (e.g., the variance of $\{\gamma_k\}$ is small), assign all nodes $\{k\}$ as the serving nodes for this RACH request;
>
> If the $\gamma_k$ are not uniformly distributed (e.g., the variance of $\{\gamma_k\}$ is larger than a threshold), pick the larger $\gamma_k$ so that the sum $\Sigma_k \gamma_k > \gamma_{th}$, where $\gamma_{th}$ is a pre-configured threshold. These nodes $\{k\}$ with larger $\gamma_k$ will be the picked nodes.

That is, the gNB sorts the nodes by respective values of the RACH Rx power, and selects those nodes for which the sum of the respective values of the RACH Rx power is below a specified threshold. In some implementations, groups of nodes rather than individual nodes are used for RACH detection. That is, the RACH is detected by combining the signal received at all the nodes within the group. The RACH detected power $\gamma_k$ would then corresponds to node group k.

At 506, the gNB transmits Msg-2, including the RAR with a value of the new parameter determined at 505.

At 507, the UE again estimates a pathloss from the subset. The UE may use a DL RS to calculate the path loss $PL_{b,f,c}$. In conventional RACH processes, the pathloss is calculated based on $$PL = P_{TX} - P_{RSRP},$$

where $P_{TX}$ is reference signal power, and $P_{RSRP}$ is the measured RSRP power from DL RS.

In contrast, when the Msg-2 is transmitted with a reduced number of nodes and accordingly a reduced Tx power, the path loss estimation may take this into account:

$$PL = P'_{TX} - P_{RSRP},$$

where $P'_{TX}$ is reduced reference power, based on a parameter indicated by Msg-3 as reduced total DL Tx power, or reduced number of DL nodes.

At 508, the UE sends a Msg-3 containing an initial RRC request to the gNB.

At 509, the gNB transmits a Msg-4 to the UE including contention resolution.

Example 1-1: FIG. 6 is a flow chart illustrating an example method 600 of performing random access in an antenna-distributed network. Operation 610 includes transmitting, by a user equipment (UE) to a network node (gNB) in a network including a plurality of antenna nodes associated with the gNB using a first total transmission (Tx) power, Msg-1 data representing a random access channel (RACH) preamble. Operation 620 includes receiving, from the gNB via a subset of the plurality of antenna nodes, Msg-2 data representing a random access response (RAR), the RAR including a reduced Tx power indicator. Operation 630 includes determining, by the UE, a second total Tx power used to transmit the RAR based on the reduced Tx power indicator, the second total Tx power being less than the first total Tx power. Operation 640 includes transmitting the Msg-3 data to the gNB using a third total Tx power based on the second total Tx power.

Example 1-2: According to an example implementation of Example 1-1, wherein the reduced Tx power indicator represents one of the second total Tx power or a reduced number of antenna nodes in the subset of the plurality of antenna nodes.

Example 1-3: According to an example implementation of Examples 1-1 or 1-2, wherein transmitting the Msg-3 data to the gNB includes transmitting the Msg-3 data to at least the antenna nodes of the subset of the plurality of antenna nodes of the gNB using the third total power.

Example 1-4: According to an example implementation of Example 1-3, further comprising determining a pathloss estimate based on the reduced Tx power indicator, indicated in the RAR.

Example 1-5: According to an example implementation of Example 1-3, further comprising performing a measurement operation on a downlink (DL) reference signal (RS) to determine a measured DL RS power, and wherein generating a pathloss estimate based on the reduced Tx power indicator includes computing a difference between the second total Tx power and the measured DL RS power.

Example 1-6: According to an example implementation of Example 1-5, wherein the DL RS includes a demodulation reference signal (DM-RS).

Example 1-7: According to an example implementation of any of Examples 1-3 to 1-6, wherein the method further comprises performing a measurement operation on a demodulation reference signal (DM-RS) to determine a measured DL RS power (RSRP), and wherein generating a pathloss estimate based on the second total Tx power includes determine the pathloss estimation based on the reduced Tx power indicator and the received RSRP.

Example 1-8: An apparatus comprising means for performing a method of any of Examples 1-1 to 1-7.

Example 1-9: A computer program product including a non-transitory computer-readable storage medium and storing executable code that, when executed by at least one data processing apparatus, is configured to cause the at least one data processing apparatus to perform a method of any of Examples 1-1 to 1-7.

Example 2-1: FIG. 7 is a flow chart illustrating a process 700 of performing random access in an antenna-distributed network. Operation 710 includes receiving, by a network node (gNB) from a user equipment (UE) via a plurality of antenna nodes, Msg-1 data representing a random access channel (RACH) preamble. Operation 720 includes performing a RACH detection operation based on the RACH preamble to determine a subset of the plurality of antenna nodes, for the specific UE. Operation 730 includes determining a subset of the plurality of antenna nodes, and a reduced Tx power indicator for the UE. Operation 740 includes transmitting Msg-2 data to the UE via the determined subset of the plurality of antenna nodes, the Msg-2 data representing a random access response (RAR), and the RAR including the reduced Tx power indicator.

Example 2-2: According to an example implementation of Example 2-1, wherein the method further identifying the subset of the plurality of antenna nodes based on the received RACH signal power of antenna nodes; and determining a reduced number of antenna nodes in the subset of the plurality of antenna nodes.

Example 2-3: According to an example implementation of Example 2-2, wherein performing the RACH detection operation includes detecting a respective RACH receive (Rx) power of each of the plurality of antenna nodes, and identifying, as the subset of the plurality of antenna nodes, a group of antenna nodes of the plurality of antenna nodes that have an aggregate RACH Rx power that is greater than a specified threshold.

Example 2-4: According to an example implementation of Example 2-3, wherein identifying the group of antenna nodes includes determining, as the subset, the smallest subset of the plurality of antenna nodes having an aggregate RACH Rx power greater than the threshold.

Example 2-5: According to an example implementation of any of Examples 2-1 to 2-4, wherein the Msg-1 data is transmitted from the UE using a first total transmission (Tx) power, and wherein the method further comprises transmitting, to the UE via the subset of the plurality of antenna nodes, the Msg-2 data representing the RAR, the RAR including a value of a parameter indicating a second total Tx power for the transmission of the Msg-3 data, the second total Tx power being less than the first total Tx power.

Example 2-6: According to an example implementation of any of Examples 2-1 to 2-5, wherein the reduced Tx power indicator of the RAR indicates the reduced number of antenna nodes in the subset of the plurality of antenna nodes.

Example 2-7: According to an example implementation of any of Examples 2-1 to 2-5, wherein the reduced Tx power indicator of the RAR indicates the second total Tx power.

Example 2-8: An apparatus comprising means for performing a method of any of Examples 2-1 to 2-7.

Example 2-9: A computer program product including a non-transitory computer-readable storage medium and storing executable code that, when executed by at least one data processing apparatus, is configured to cause the at least one data processing apparatus to perform a method of any of Examples 2-1 to 2-7.

List of Example Abbreviations

| | |
|---|---|
| AP | Access Point |
| BWP | Bandwidth Part |
| C-RNTI | Cell RNTI |
| CSI | Channel state information |
| CSI-RS | CSI reference signal |
| D-MIMO | Distributed MIMO |
| DL | Downlink |
| DM-RS | Demodulation reference signal |
| gNB | 5G Base Station |
| MIMO | Multi-Input Multi-Output |
| NR | New Radio (5G) |
| PL | Path Loss |
| PRACH | Physical RACH |
| PDSCH | Physical downlink shared channel |
| PUSCH | Physical uplink shared channel |
| RACH | Random Access Channel |
| RAR | RACH Response |
| RNTI | Radio Network Temporary Identifier |
| RS | Reference Signal |
| RSRP | Reference Signal Received Power |
| Rx | Receive |
| Rx-Tx | Receive-Transmit |
| SFN | Single Frequency Network |
| SSB | Synchronization Signal Block |
| TRP | Transmission/Reception Point |
| Tx | Transmit |
| UE | User Equipment |
| UL | Uplink |

Figure 8:
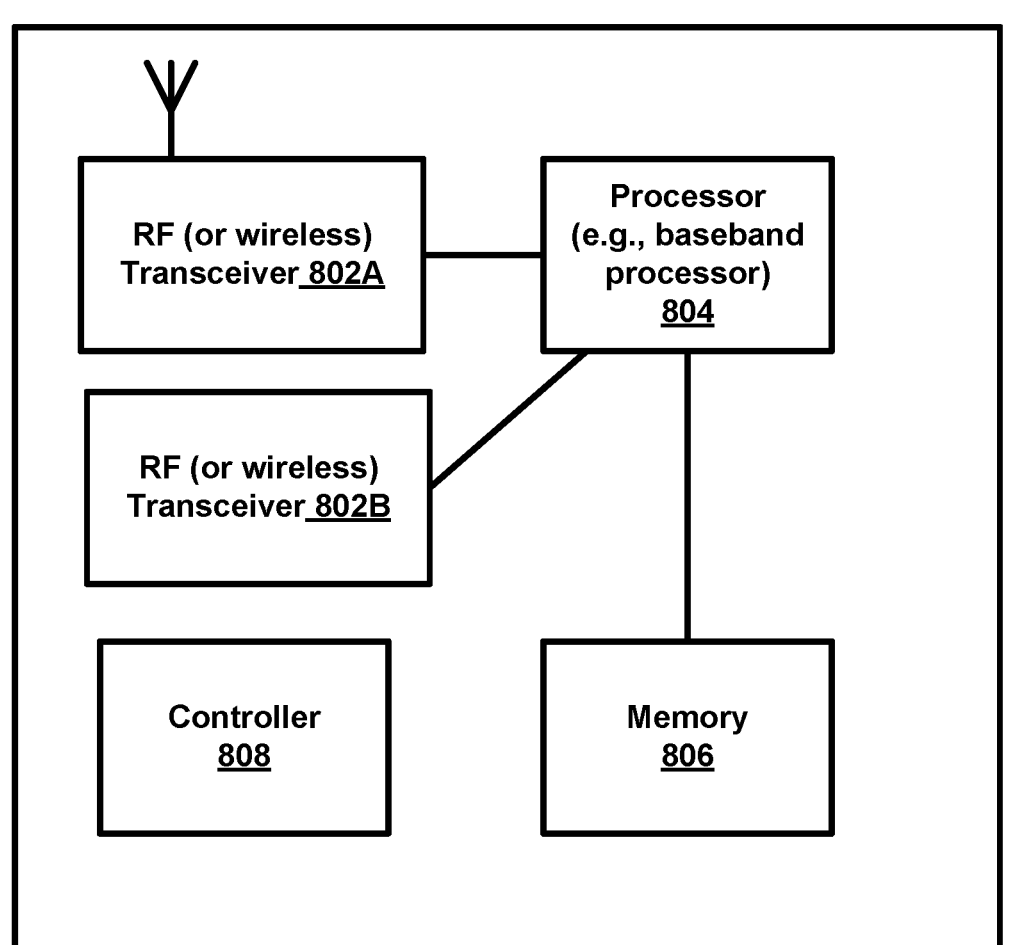
FIG. 8 is a block diagram of a node or wireless station (e.g., base station/access point, relay node, or mobile station/ user device) according to an example implementation.

FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:

at least one processor; and at least one memory including computer program code;

the at least one memory and the computer program code configured to cause the apparatus at least to:

transmit, to a network node (gNB) in a network including a plurality of antenna nodes associated with the gNB using a first total transmission (Tx) power, Msg-1 data representing a random access channel (RACH) preamble;

receive, from the gNB via a subset of the plurality of antenna nodes, Msg-2 data representing a random access response (RAR), the RAR including a reduced Tx power indicator;

determine a second total Tx power used to transmit the RAR based on the reduced Tx power indicator, the second total Tx power being less than the first total Tx power; and transmit Msg-3 data to the gNB using a third total Tx power based on the second total Tx power, wherein the at least one memory and the computer program code configured to transmit the Msg-3 data to the gNB is further configured to cause the apparatus at least to:

transmit the Msg-3 data to at least the antenna nodes of the subset of the plurality of antenna nodes of the gNB using the third total power, and wherein the at least one memory and the computer program code is further configured to cause the apparatus at least to:

perform a measurement operation based on a downlink reference signal to determine a reference signal received power; and wherein the at least one memory and the computer program code configured to generate a pathloss estimate based on the reduced Tx power indicator further cause the apparatus at least to:

determine the pathloss estimation based on the reduced Tx power indicator and the reference signal received power.

2. The apparatus as in claim 1, wherein the downlink reference signal includes a demodulation reference signal.

3. A method, comprising:

transmitting, by a user equipment (UE) to a network node (gNB) in a network including a plurality of antenna nodes associated with the gNB using a first total transmission (Tx) power, Msg-1 data representing a random access channel preamble;

receiving, from the gNB via a subset of the plurality of antenna nodes, Msg-2 data representing a random access response (RAR), the RAR including a reduced Tx power indicator;

determining, by the UE, a second total Tx power used to transmit the RAR based on the reduced Tx power indicator, the second total Tx power being less than the first total Tx power;

transmitting Msg-3 data to the gNB using a third total Tx power based on the second total Tx power;

determining a pathloss estimate based on the reduced Tx power indicator; and performing a measurement operation on a downlink reference signal to determine a measured DL RS power; and wherein generating a pathloss estimate based on the reduced Tx power indicator includes:

determining the pathloss estimate based on the reduced Tx power indicator and the reference signal received power.

4. The method as in claim 3, wherein the downlink reference signal includes a demodulation reference signal.

* * * * *